US011882020B2

(12) United States Patent
Nainar et al.

(10) Patent No.: US 11,882,020 B2
(45) Date of Patent: *Jan. 23, 2024

(54) SERVICE ASSURANCE OF ECMP USING VIRTUAL NETWORK FUNCTION HASHING ALGORITHM

(71) Applicant: Cisco Technology, Inc., San Jose, CA (US)

(72) Inventors: Nagendra Kumar Nainar, Morrisville, NC (US); Carlos M. Pignataro, Cary, NC (US); Jaganbabu Rajamanickam, Ontario (CA); Madhan Sankaranarayanan, Chennai (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,908

(22) Filed: Nov. 17, 2022

(65) Prior Publication Data

US 2023/0076447 A1 Mar. 9, 2023

Related U.S. Application Data

(63) Continuation of application No. 17/231,445, filed on Apr. 15, 2021, now Pat. No. 11,575,593, which is a
(Continued)

(51) Int. Cl.
*H04L 45/00* (2022.01)
*H04L 45/7453* (2022.01)
*H04L 45/24* (2022.01)

(52) U.S. Cl.
CPC .............. *H04L 45/14* (2013.01); *H04L 45/24* (2013.01); *H04L 45/7453* (2013.01)

(58) Field of Classification Search
CPC ......... H04L 45/14; H04L 45/16; H04L 45/22; H04L 45/24; H04L 45/74; H04L 45/745; H04L 45/7453
See application file for complete search history.

(56) References Cited

U.S. PATENT DOCUMENTS 8,170,022 B2   5/2012   Tychon et al.
8,477,600 B2 *  7/2013   Yong ..................... H04L 47/125
                                                    370/225
(Continued)

FOREIGN PATENT DOCUMENTS

EP    2472784 A1    7/2012
WO   2016089921 A1   6/2016
WO   2017144943 A1   8/2017

OTHER PUBLICATIONS

Cisco, "Intent-Based Networking", White paper Cisco public, Jan. 2018, 11 pages.
(Continued)

*Primary Examiner* — Kevin D Mew
(74) *Attorney, Agent, or Firm* — Edell, Shapiro & Finnan, LLC

(57) ABSTRACT

Techniques are presented for evaluating Equal Cost Multi-Path (ECMP) performance in a network that includes a plurality of nodes. According to an example embodiment, a method is provided that includes obtaining information indicating equal cost multi-path (ECMP) paths in the network and a branch node in the network. For the branch node in the network, the method includes instantiating a virtual network function that simulates an ECMP hashing algorithm employed by the branch node to select one of multiple egress interface of the branch node; providing to the virtual network function for the branch node, a query containing entropy information as input to the ECMP hashing algorithm that returns interface selection results; and obtaining from
(Continued)

the virtual network function a reply that includes the interface selection results. The method further includes evaluating ECMP performance in the network based on the interface selection results obtained for the branch node.

20 Claims, 5 Drawing Sheets

Related U.S. Application Data continuation of application No. 16/601,747, filed on Oct. 15, 2019, now Pat. No. 11,038,793.

(56) References Cited

U.S. PATENT DOCUMENTS

| | | | |
|---|---|---|---|
| 8,787,400 B1* | 7/2014 | Barth | H04L 45/24 370/419 |
| 9,071,541 B2* | 6/2015 | Atlas | H04L 45/24 |
| 9,185,040 B2* | 11/2015 | Guo | H04L 47/724 |
| 9,432,245 B1 | 8/2016 | Sorenson, III et al. | |
| 9,559,961 B1 | 1/2017 | Sorenson, III et al. | |
| 9,843,520 B1 | 12/2017 | Haltore et al. | |
| 10,158,556 B2 | 12/2018 | Iqbal et al. | |
| 10,164,907 B2 | 12/2018 | Allan | |
| 10,212,089 B1* | 2/2019 | Narayanan | H04L 47/125 |
| 10,826,822 B2* | 11/2020 | Gafni | H04L 45/50 |
| 10,904,136 B2 | 1/2021 | Allan | |
| 2006/0218279 A1 | 9/2006 | Yamaguchi et al. | |
| 2011/0013639 A1* | 1/2011 | Matthews | H04L 45/22 370/395.32 |
| 2012/0063314 A1 | 3/2012 | Pignataro et al. | |
| 2012/0243544 A1* | 9/2012 | Keesara | H04L 12/4633 370/395.53 |
| 2014/0310418 A1 | 10/2014 | Sorenson, III et al. | |
| 2015/0009995 A1 | 1/2015 | Gross, IV et al. | |
| 2015/0029872 A1 | 1/2015 | Pignataro et al. | |
| 2015/0146575 A1 | 5/2015 | Singh | |
| 2015/0156106 A1* | 6/2015 | Allan | H04L 45/24 370/238 |
| 2015/0263940 A1* | 9/2015 | Kini | H04L 45/507 370/236.2 |
| 2015/0281082 A1* | 10/2015 | Rajahalme | H04L 69/22 370/392 |
| 2016/0020941 A1 | 1/2016 | Asati et al. | |
| 2016/0134518 A1* | 5/2016 | Callon | H04L 45/54 370/390 |
| 2016/0182380 A1 | 6/2016 | Mehra et al. | |
| 2016/0197853 A1 | 7/2016 | Kumar et al. | |
| 2016/0301579 A1 | 10/2016 | Djukic et al. | |
| 2017/0063783 A1 | 3/2017 | Yong et al. | |
| 2017/0366461 A1 | 12/2017 | Wu et al. | |
| 2018/0062991 A1 | 3/2018 | Nainar et al. | |
| 2018/0091426 A1* | 3/2018 | Bao | H04L 43/0888 |
| 2018/0109444 A1* | 4/2018 | Sajassi | H04L 45/28 |
| 2018/0176134 A1* | 6/2018 | Pignataro | H04L 67/10 |
| 2018/0278510 A1 | 9/2018 | Iqbal et al. | |
| 2018/0307712 A1 | 10/2018 | Baradaran et al. | |
| 2018/0331947 A1 | 11/2018 | James et al. | |
| 2019/0014034 A1 | 1/2019 | Allan | |
| 2019/0081882 A1 | 3/2019 | Iqbal et al. | |
| 2019/0182155 A1 | 6/2019 | Chang | |
| 2019/0296922 A1 | 9/2019 | Dutta | |
| 2019/0297000 A1 | 9/2019 | Dutta | |
| 2019/0319872 A1 | 10/2019 | Adhikari et al. | |
| 2019/0386918 A1 | 12/2019 | Iyer et al. | |
| 2020/0120013 A1* | 4/2020 | Goud Gadela | H04L 49/25 |
| 2020/0204492 A1 | 6/2020 | Sarva et al. | |
| 2020/0314016 A1 | 10/2020 | Dutta | |
| 2020/0344166 A1 | 10/2020 | Roberts et al. | |
| 2021/0111989 A1 | 4/2021 | Nainar et al. | |

OTHER PUBLICATIONS

Versa, "Versa FlexVNF", Versa Networks, Santa Clara, CA, Jan. 2017, 4 pages.

Pfister, Pierre et al., "Techniques for Efficient and Consistent Hashing With Optimal Fairness for Flow Distribution and Load-Balancing", Technical Disclosure Commons, Jan. 9, 2019, 4 pages.

Huawei, "Understanding the Hash Algorithm", Huawei Technologies Co., Ltd., Issue 01, Jun. 28, 2019, 8 pages.

Levine, Matt, "A simple pattern to do weighted ECMP + health checking for load balancing on JunOS using Linux & Quagga", https://medium.com/cachefly/a-simple-pattern-to-do-weighted-ecmp-health-checking-for-load-balancing-on-iunos-using-linux-7456f9fefcf3, Aug. 14, 2018, 6 pages.

Micro Focus, "Network Node Manager i", Data Sheet IT Operations Management, Sep. 2019, 9 pages.

Brockners, Frank, "Always on visibility: In-band OAM for IPv6", downloaded Sep. 30, 2019, BRKRST-2606, 84 pages.

Mandal, Kingshuk, "Validating Equal-Cost Multi-Path (ECMP) at Scale", Feb. 26, 2018, 6 pages.

Cisco, "ECMP Load Balancing", MPLS: Layer 3 VPNs Configuration Guide, Cisco IOS XE Release 3S (Cisco ASR 900 Series), downloaded Sep. 30, 2019, 12 pages.

Cisco, "A Need for Multiprotocol Label Switching Operation Administration Maintenance", Jun. 2007, 14 pages.

International Search Report and Written Opinion in International Application No. PCT/US2020/054993, dated Nov. 30, 2020, 14 pages.

Alec Pinkham, "ECMP Monitoring 101: Increase resiliency without losing visibility", AppNeta, May 9, 2019, 4 pages.

Alcatel Lucent, "Segment Routing and Path Computation Element", Technology White Paper, Oct. 2015, 28 pages.

* cited by examiner

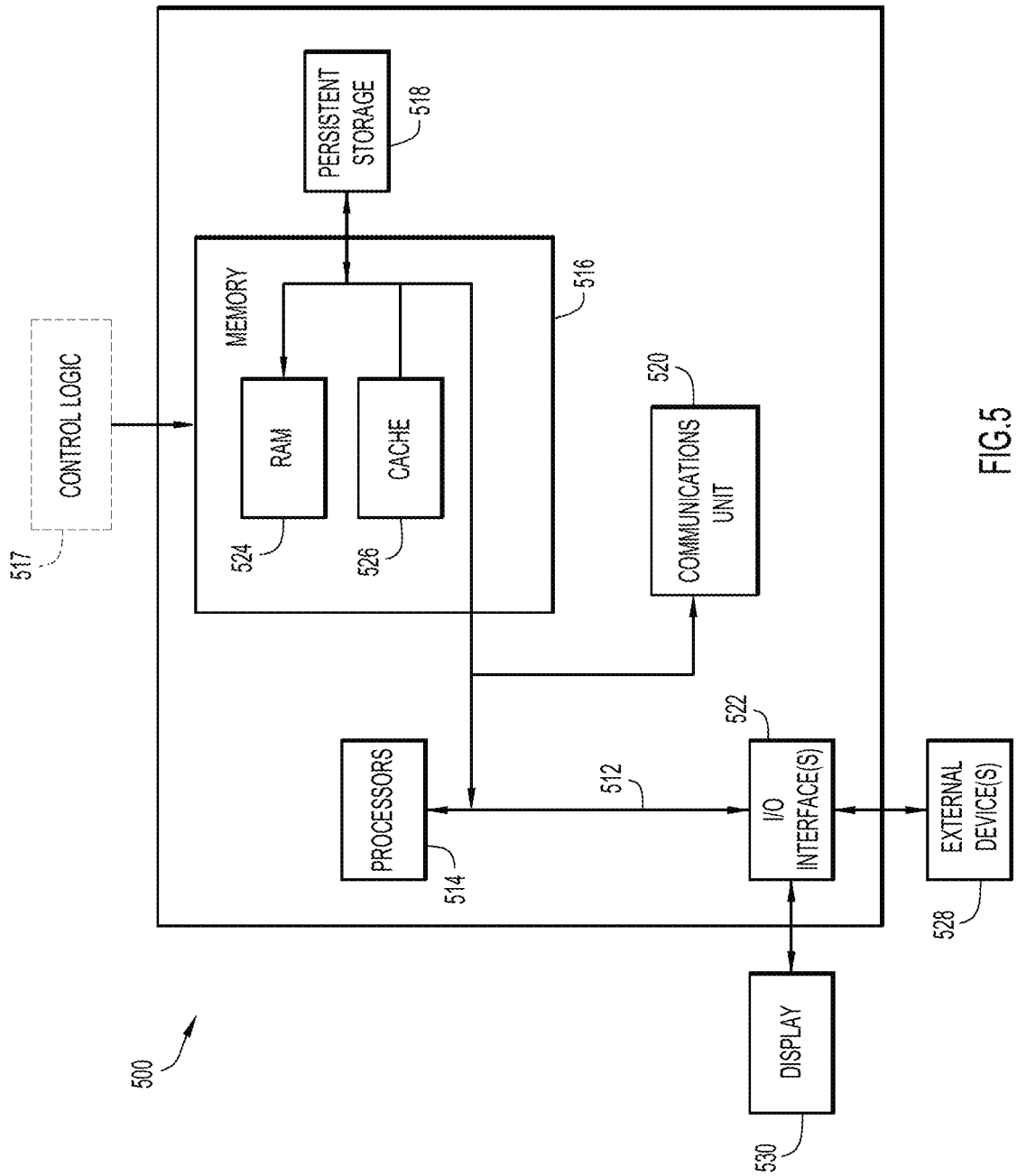

SERVICE ASSURANCE OF ECMP USING VIRTUAL NETWORK FUNCTION HASHING ALGORITHM

CROSS REFERENCE TO RELATED APPLICATION

This application is a continuation of U.S. application Ser. No. 17/231,445, filed Apr. 15, 2021, which is a continuation of U.S. application Ser. No. 16/601,747, filed Oct. 15, 2019, now U.S. Pat. No. 11,038,793, issued Jun. 15, 2021, the entirety of each of which is incorporated herein by reference.

TECHNICAL FIELD

The present disclosure relates to service assurance in a network.

BACKGROUND

Equal Cost Multi-Path (ECMP) is often used in a network for efficient load balancing and network resiliency. In an ECMP network environment, path selection may be made by a transit node based on a local hashing mechanism that considers various key values from the packet header (such as Internet Protocol (IP) header information, Internet Protocol version 6 (IPv6) flow label, entropy labels, etc.) and local variables (incoming interface identifier, loopback address, etc.). Depending on the network design and deployment model, the number of ECMP paths between endpoints may vary between two to several hundreds or even thousands. Even more ECMP paths may result from multiple transit node local ECMP decisions, also known as "cascaded ECMP".

BRIEF DESCRIPTION OF THE DRAWINGS

FIG. 5 is a block diagram of a computing device configured to perform the operations presented herein, according to an example embodiment.

DESCRIPTION OF EXAMPLE EMBODIMENTS

Overview

Techniques are presented herein for evaluating ECMP performance in a network that includes a plurality of nodes. According to an example embodiment, a method is provided that includes obtaining information indicating equal cost multi-path (ECMP) paths in the network and a branch node in the network. For the branch node in the network, the method includes instantiating a virtual network function that simulates an ECMP hashing algorithm employed by the branch node to select one of multiple egress interface of the branch node; providing to the virtual network function for the branch node, a query containing entropy information as input to the ECMP hashing algorithm that returns interface selection results; and obtaining from the virtual network function a reply that includes the interface selection results. The method further includes evaluating ECMP performance in the network based on the interface selection results obtained for the branch node.

Example Embodiments

Service Assurance for Intent-based Networking is a technology designed to provide "Service Assurance" as a service for end customers of network services. ECMP path assurance is a use case that network operators are interested to monitor/assure. For example, it may be desirable to:
1. Identify all the available ECMP paths between the endpoints and assure the availability of the paths (uptime and operation).
2. Identify the path taken by a specific packet flow.
3. Determine whether the load is distributed among the available paths between endpoints.

Figure 1:
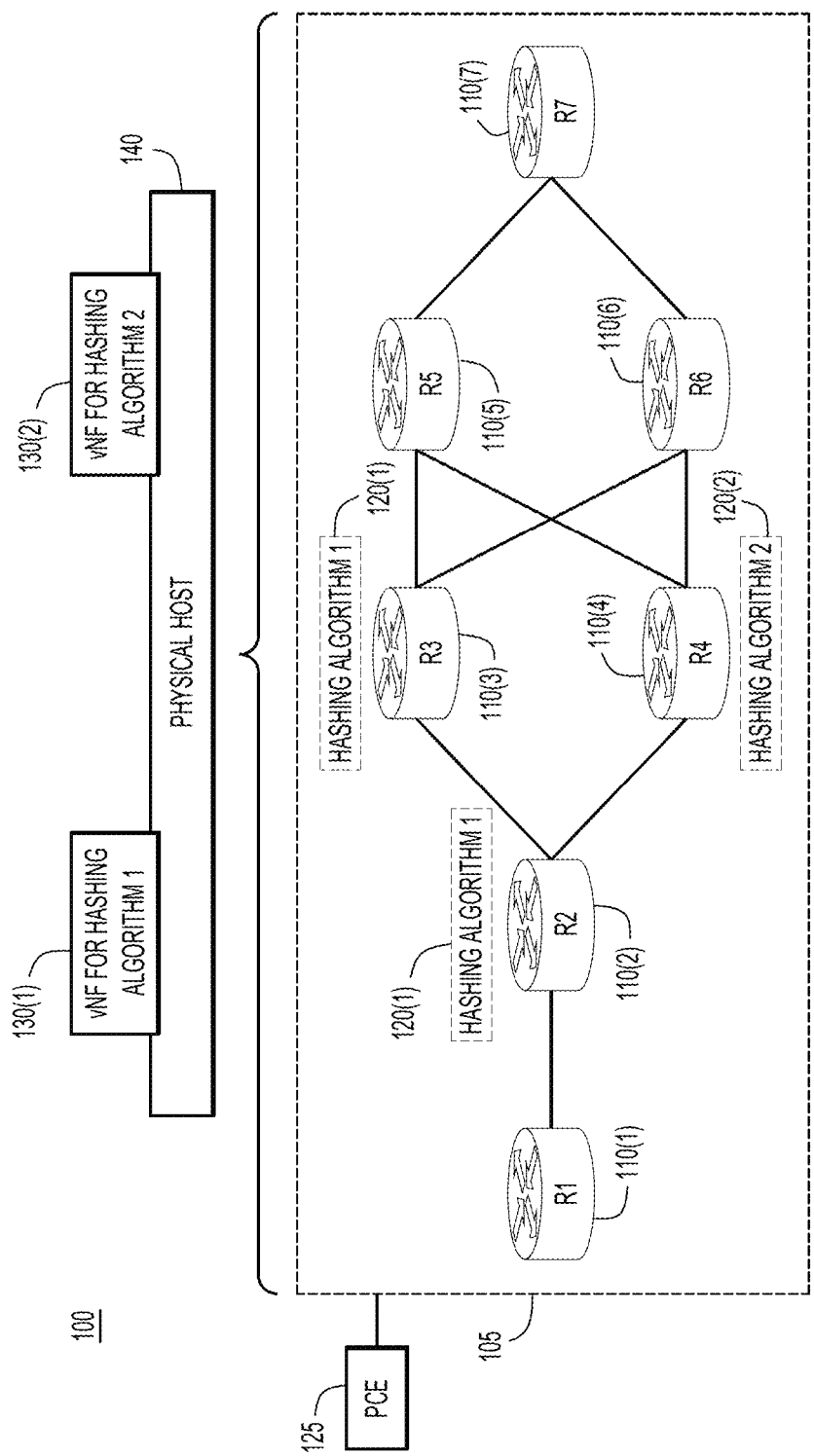
FIG. 1 is a block diagram of a system configured to simulate ECMP hashing algorithms running on nodes in a network in order evaluate ECMP performance in the network, according to an example embodiment.

Reference is now made to FIG. 1. FIG. 1 illustrates a system 100 that includes a network 105 that includes seven network elements (e.g., routers) R1-R7 at 110(1)-110(7). There are four ECMP paths between edge nodes R1 and R7 in the network 105:

Path 1: R1-R2-R3-R5-R7
Path 2: R1-R2-R3-R6-R7
Path 3: R1-R2-R4-R6-R7
Path 4: R1-R2-R4-R5-R7

Nodes R2, R3 and R4 are branch nodes in the network 105 in that these nodes can direct a packet flow through one of the four paths for a packet flow from R1 to R7. The ECMP hashing algorithm running on a given network device may vary depending on the operating system running on that device. The ECMP hashing algorithm may use proprietary code that creates different "buckets" and associates the buckets with the egress interfaces on the network device. The hashing algorithm is based on a hash seed and packet entropy, and identifies the bucket, and associated egress interface, for a given packet of a packet flow.

As an example, node R2 uses Hashing Algorithm 1 shown at 120(1) for performing ECMP routing to either node R3 or node R4, node also R3 uses Hashing Algorithm 1 shown at 120(1) for ECMP routing to either node R5 or node R6, and node R4 uses Hashing Algorithm 2 shown at 120(2) for ECMP routing to either node R5 or node R6. Nodes R2, R3 and R4 could all use the same hashing algorithm or they could all use different hashing algorithms. That nodes R2 and R3 use the same hashing algorithm and node R4 uses a different hashing algorithm is only an example, and is not meant to be limiting.

FIG. 1 also shows a Path Computation Element (PCE) 125 that is used to compute the various paths through the network 105, and provide information describing those paths to the nodes R1-R7.

One way to verify/evaluate ECMP performance in a network, such as network 105, is to analyze the entropy hashing to interface mapping. One existing technique to do this is to query the entropy along the path (using an Out-of-Band (OOB) mechanism or Label Switching Protocol (LSP) tree trace), using either an entropy range query to identify the entropy to be used for each available ECMP path, or an entropy path query to identify the path taken for a specific entropy.

Depending on the type of underlay/overlay network used, the end-to-end path (and thus the ECMP path) may span across multiple domains. One option is to extend the entropy query (LSP tree trace) capability for all the underlay networks. This involves sending a probe with a range of entropy in a packet payload. Entropy can be source Internet Protocol (IP) address range, User Datagram Protocol (UDP) port range, and entropy label range. The node that receives the probe query uses the details contained in the query and replies back with a range of entropy for each outgoing interface of that node.

However, querying the relevant transit nodes with all the entropy details at the relevant layer (L2/L3/Underlay/Overlay/etc.) is very complex and it is highly desirable to avoid querying the network (to avoid computational/resource intensive queries to the network nodes). Even if a customer wanted to query the network, there is a major practical device limitation: querying the control plane for every single hash input is simply not possible.

There are other known techniques that involve leveraging the PCE 125. The PCE 125 helps to identify the branching nodes. A controller can select only those nodes for analysis, but this technique still involves control plane intervention on such nodes.

It is nevertheless desirable to identify the exact path taken by a packet flow that depends on entropy. The entropy may include source/destination IP addresses, source/destination (UDP) ports, source/destination labels etc. Even in a medium-sized network, depending on the number of flows, an entropy query using conventional techniques may result in an enormous number of queries. Moreover, ECMP evaluation needs to be done every time there is a change in the ECMP topology of the network.

End-to-end ECMP path assurance and service load distribution is an important service assurance use case. It is desirable to achieve the same in an end-to-end manner (spanning different types of underlay/overlay network) without interrupting the production network. Presented herein are techniques that avoid the dependency on querying nodes in the production network.

Network devices (switches, routers, line cards, etc.) use proprietary code for performing an ECMP bucket hashing computation in order to determine on which egress interface to direct a packet flow. The ECMP hashing computation creates different "buckets" and associates them with egress interfaces. The hashing computation is based on packet entropy (source/destination IP addresses, source/destination (UDP) ports, labels, etc.). Network devices or nodes may include routers, switches, gateways, and other network devices (physical or virtual).

More specifically, techniques are provided for extracting the ECMP hashing algorithm/computation and running it as a Virtual Network Function (vNF) to identify the entropy to be used without querying the in-use network. A query is provided to the vNF. The vNF simulates the ECMP bucket hashing, runs the hashing based on the query and replies back with the associated egress interface or range of interfaces, for example.

To this end, as shown in FIG. 1, a vNF 130(1) is created for Hashing Algorithm 1 running on node R2 and on node R3, and a vNF 130(2) is created for Hashing Algorithm 2 that runs on node R4. The vNFs 130(1) and 130(2) are instantiated and hosted on a physical host 140. The physical host 140 may be a computing device (e.g., server computer) that is local to, or remote from, the network 105. For example, the physical host 140 may be in the cloud.

Extracting the hashing algorithm for each of the relevant nodes in a network, e.g., network 105, may involve obtaining the hashing code or algorithm from a central entity (support website, for example) that stores the hashing code for the network devices sold by a particular vendor. As long as the operating system version running on the network device is known, it is possible to obtain the hashing algorithm for that network device. The vNFs 130(1) and 130(2) are used to simulate the buckets/interfaces on a network device.

More specifically, each vNF can be considered as a "mini" router (with no other functionalities) and is used to perform an entropy query. An entropy query is a two-step procedure. The first step is Prefix Simulation. Prefix Simulation involves the vNF simulating interfaces and creating a prefix-to-egress interface mapping by creating buckets and mapping the buckets with the interfaces. The state entries in the mapping include a prefix or label and an associated egress interface.

The second step is called Entropy Computation. Entropy Computation involves executing/running the vNF for the relevant entropy (source IP, destination IP, source UDP port, destination UDP port, etc.) provided in a query and outputting the interface or interface range resulting from the hashing computation performed on the entropy.

For any prefix P, the nodes with ECMP paths are identified. A PCE may be leveraged to identify the nodes with ECMP paths. During Prefix Simulation, the prefix and relevant number of egress interfaces are simulated by the vNF.

Figure 2:
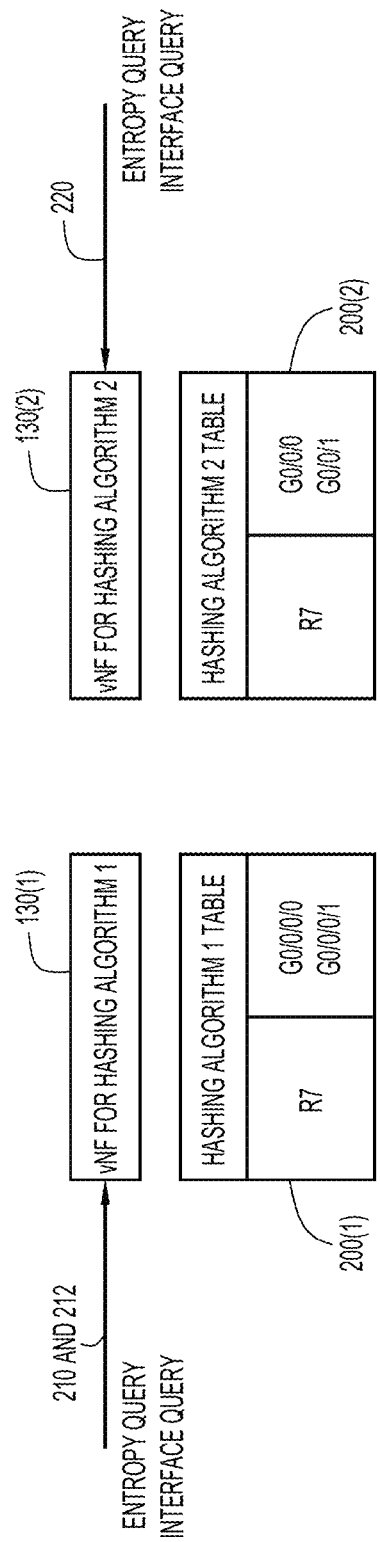
FIG. 2 is a diagram illustrating operations of virtual network functions that are instantiated to simulate operation of ECMP hashing algorithms, according to an example embodiment.

Reference is now made to FIG. 2, with continued reference to FIG. 1. FIG. 2 shows vNF 130(1) instantiated for Hashing Algorithm 1 and vNF 130(2) instantiated for Hashing Algorithm 2. In the topology of network 105, there are 3 ECMP branch nodes for Prefix R7 from R1:

Node R2 which runs Hashing Algorithm 1
Node R3 which runs Hashing Algorithm 1
Node R4 which runs Hashing Algorithm 2

Node R2 has two egress interfaces, one interface connected to R3 and another interface connected to R4. Similarly, node R3 has two egress interfaces, one connected to R5 and another connected interface connected to R6. Finally, node R4 has two egress interfaces, one connected to R5 and another connected interface connected to R6. For each branch node R2, R3 and R4, a vNF is used to simulate the prefix R7 with two egress interfaces.

As shown in FIG. 2, a table 200(1) is created for the Hashing Algorithm 1. The table 200(1) lists the destination or prefix R7 and two "dummy" interfaces (G0/0/0/0 and G0/0/0/1) that represent the two egress interfaces for nodes R2 and R3 that run Hashing Algorithm 1. Similarly, a table 200(2) is created for Hashing Algorithm 2. The table 200(2) lists the destination or prefix R7 and two "dummy" interfaces (G0/0/0 and G0/0/1) that represent the two egress interfaces for node R4 that runs Hashing Algorithm 2.

A query is provided to the vNFs 130(1) and 130(2). For example, a query is provided at 210 to the vNF 130(1), with relevant entropy details in order to identify the egress interfaces of node R2. Similarly, a query is provided at 212 the vNF 130(1), with relevant entropy details to identify the egress interfaces of node R3. Moreover, a query is provided at 220 to vNF 130(2), with relevant entropy details to identify the egress interfaces of node R4.

The query can be one of an Entropy Query or an Interface Query. An Entropy Query specifies a range of entropy that results in selection of each of the egress interfaces. This is useful for operations, administration and management (OAM) purposes. For example, an Entropy Query may be:
   Src=R1
   Dst=R7
   Src_udp_port=[1-750] (a range of UDP ports from 1 to 750.)
   Dst_udp_port=7784
The results of an Entropy Query may be:
   Range[1-500], Interface1 (a first egress interface)
   Range[501-750], Interface2 (a second egress interface.
In other words, the results of an Entropy Query indicates the range of entropy, in this example the range of source UDP port numbers, that results in selection of each of the egress interfaces of a node, Interface1 or Interface2, for example. The UDP source port number range 1-500 results in selection of a first interface and the UDP source port range 501-750 results in selection of a second interface.

An Interface Query includes information for a specific entropy and will result in which particular egress interface will be selected for that specific entropy. For example, an Interface Query may be:
   Src=R1
   Dst=R7
   Src_udp_port=532
   Dst_udp_port=7784
The results of this Interface Query may be, for example:
   Interface1 (a first egress interface of the node).
Further examples of the Entropy Query and the Interface Query are described in more detail below in connection with FIG. 3.

Figure 3:
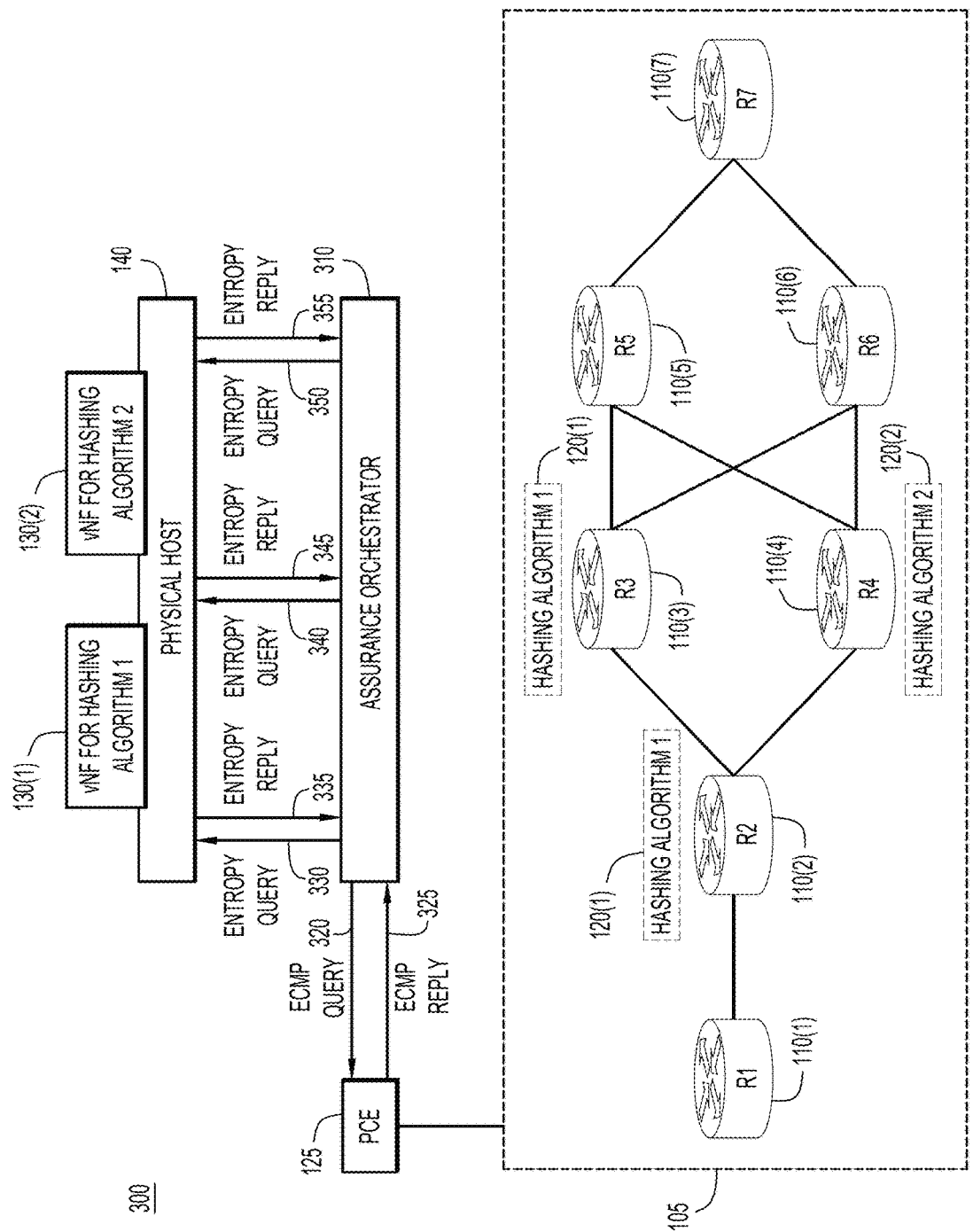
FIG. 3 is a diagram of a system configured to evaluate ECMP performance in a network, according to an example embodiment.

FIG. 3 illustrates a diagram of a system 300 that includes the network 105, as well as the PCE 125 and physical host 140 from FIG. 1. The system 300 further includes an assurance orchestrator 310 that is in communication with the PCE 125 and the physical host 140 on which the vNF 130(1) and vNF 130(2) are deployed. It should be understood that the physical host 140 may have numerous other vNFs instantiated thereon for hashing algorithms for other types/versions of nodes in a given network.

In an example use case, the assurance orchestrator 310 is to compute the ECMP paths and the relevant entropy to validate all ECMP paths between R1 and R7. The assurance orchestrator 310, at 320, queries the PCE 125 for the ECMP branch nodes in the network 105. At 325, the PCE 125 replies with 3 ECMP branch nodes: R2, R3 and R4; and 4 ECMP paths in the network. The 4 ECMP paths for network 105 are the same as those listed above in connection with the description of network 105 shown in FIG. 1, reproduced below:
   Path 1: R1-R2-R3-R5-R7
   Path 2: R1-R2-R3-R6-R7
   Path 3: R1-R2-R4-R6-R7
   Path 4: R1-R2-R4-R5-R7

The assurance orchestrator 310 may maintain a device repository to identify the relevant version/type of nodes in network 105 in order to trigger the appropriate vNF instantiated on the physical host 140.

Next, at 330, the assurance orchestrator 310 queries the vNF 130(1), which simulates the ECMP Hashing Algorithm 1, for node R2. This query 330 may be an Entropy Query that includes, for example, information such as:
   Src=R1
   Dst=R7
   Src_udp_port=[1-1000]
   Dst_udp_port=7784

Thus, the Entropy Query sent at 330 includes a specific source (R1), a specific destination (R7), a source UDP port range [1-1000] and a specific destination UDP port.

The vNF 130(1) runs ECMP Hashing Algorithm 1 for the information in the Entropy Query obtained at 330. The vNF 130(1) replies, at 335, with results that indicate which UDP destination port range selects which of the two egress interfaces, as below:
   Range[1-500], Interface1 (NH=R3)
   Range[501-1000], Interface2 (NH=R4)
In other words, the Entropy Reply received from the vNF 130(1) indicates that a source UDP port range of [1-500] will result in selecting the first egress interface, e.g., the egress interface for which the next hop (NH) of R2 is R3, and the source UDP port range of [501-1000] will select the second egress interface, e.g., the egress interface for which the NH of R2 is R4.

Similarly, at 340, the assurance orchestrator 310 queries the vNF 130(1) for node R3. The query 340 may be an Entropy Query that includes information such as:
   Src=R1
   Dst=R7
   Src_udp_port=[1-500]
   Dst_udp_port=7784
The vNF 130(1) runs ECMP Hashing Algorithm 1 for the information in the Entropy Query obtained at 340. The vNF 130(1) replies, at 345, with results that indicate which UDP destination port range selects which of the two egress interfaces:
   Range[1-250], Interface1 (NH=R5)
   Range[251-500], Interface2 (NH=R6)
Again, the Entropy Reply obtained at 345 indicates that the source UDP range [1-250] will result in selecting the first egress interface of R3, for which node R5 is the NH, and the source UDP range [251-500] will result in selecting the second egress interface of R3, for which node R6 is the NH.

Further still, at 350, the assurance orchestrator 310 queries the vNF 130(2) to run the ECMP Hashing Algorithm 2 for node R4. For example, the query sent at 350 is an Entropy Query that includes the information:
   Src=R1
   Dst=R7
   Src_udp_port=[501-1000]
   Dst_udp_port=7784
The vNF 130(2) runs the Hashing Algorithm 2 for this information and provides the results in an Entropy Reply at 355. For example, the Entropy Reply from vNF 130(2) includes the information:
   Range[501-750], Interface1 (NH=R5)
   Range[751-1000], Interface2 (NH=R6)
These results in the Entropy Reply indicate that the source UDP range [501-750] will result in selecting the first egress interface of R4, for which node R5 is the NH, and the source UDP range [751-1000] will result in selecting the second egress interface of R4, for which node R6 is the NH.

Figure 4:
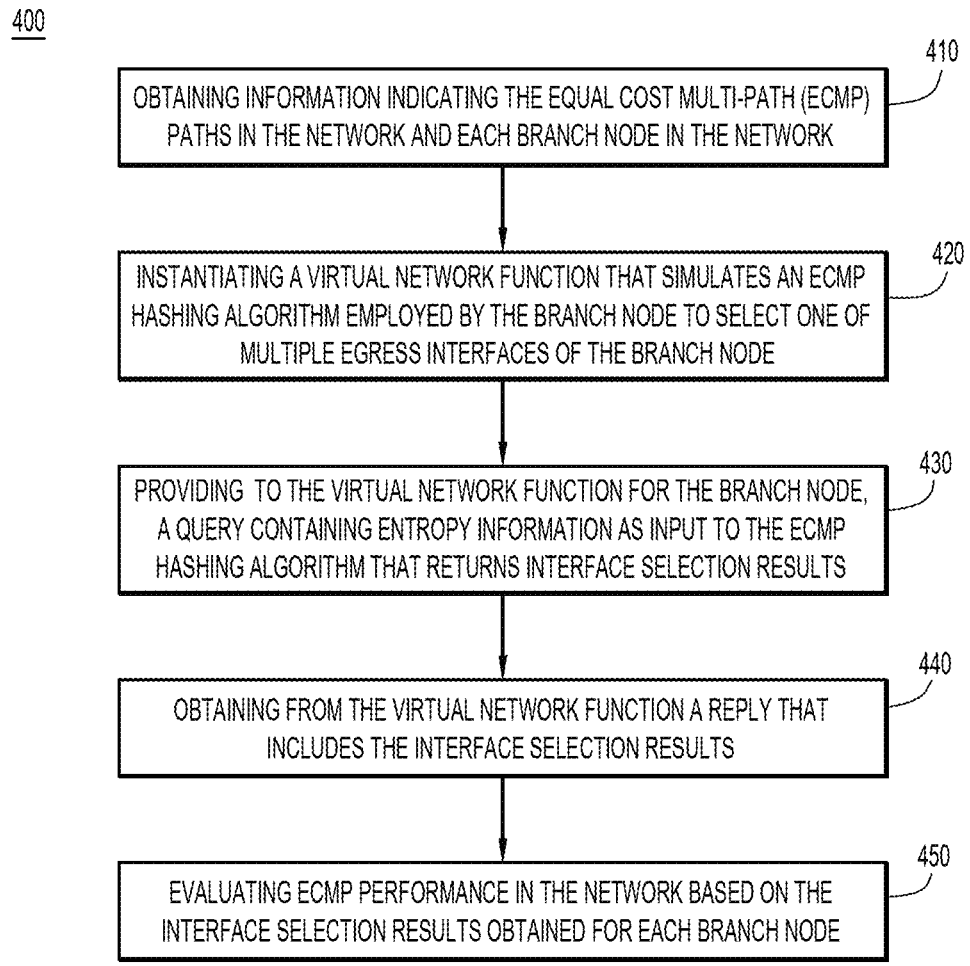
FIG. 4 is a diagram of a flow chart depicting a method to evaluate ECMP performance in a network, according to an example embodiment.

Reference is now made to FIG. 4. FIG. 4 illustrates a flow chart for a method 400 for evaluating ECMP performance in a network, according to an example embodiment. Method 400 is performed for a network that includes a plurality of nodes, one or more of which perform ECMP hashing of packet flows in the network. At 410, the method includes obtaining information indicating ECMP paths in the network and a branch node in the network. This may involve querying a PCE, such as PCE 125 shown in FIG. 3, or some other entity that has knowledge of the topology and configuration of elements in the network of interest.

Several operations, 420-440, may be performed for each branch node in the network. At 420, the method involves instantiating a virtual network function that simulates an ECMP hashing algorithm employed by the branch node to select one of multiple egress interfaces of the branch node. At 430, the method involves providing to the virtual network function for the branch node, a query containing entropy information as input to the ECMP hashing algorithm that returns interface selection results. At 440, the method involves obtaining from the virtual network function a reply that includes the interface selection results.

At 450, the method involves evaluating ECMP performance in the network based on the interface selection results obtained for the branch node.

As described above, the providing operation 430 may involve providing a range of entropy that causes the virtual network function to generate interface selection results that include a range of entropy that results in selection of each egress interface of the multiple egress interfaces of the branch node. This corresponds to an Entropy Query, referred to above.

In another form, the providing operation 430 may involve providing a specific entropy that causes the virtual network function to generate interface selection results indicating a particular egress interface of the multiple egress interfaces of the branch that will be selected for the specific entropy. This corresponds to an Interface Query, referred to above.

The operation 420 of instantiating may involve instantiating the virtual network function on a physical host computing device.

The operation 410 of obtaining the information indicating the ECMP paths in the network may involve an orchestrator entity querying a path computation element for the network. In one example embodiment, the operation 430 may include the orchestrator entity providing the query to the physical host computing device, and wherein the operation 440 of obtaining the reply comprises obtaining the reply from the physical host computing device.

The method 400 may further include performing a configuration change to the one or more nodes in the network based on evaluation of the ECMP performance of the branch nodes in the network.

FIG. 5 illustrates a hardware block diagram of a computing device 500 that may perform functions of the assurance orchestrator 310 and physical host 140, described above in connection with FIGS. 1-4. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media. Instructions for the control logic 517 that controls and performs operations of the assurance orchestrator 310 or physical host 140, may be stored in memory 516 or persistent storage 518 for execution by processor(s) 514. When the processor(s) 514 execute the control logic for the assurance orchestrator 310, the processor(s) 514 are caused to perform the assurance orchestrator 310 functions described above in connection with FIGS. 1-4. When the processor(s) 514 execute the control logic for the physical host 140, the processor(s) 514 are caused to perform the operations of the vNF 130(1) and 130(2) described above in connection with FIGS. 1-4.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, methods are provided herein for extracting the ECMP hashing algorithm of a node in a network and running the same as a vNF. Moreover, a device repository is leveraged to identify the relevant version/type to trigger the vNF. The vNF is used to dynamically simulate prefix with multiple egress interfaces and query the hashing algorithm to perform an out-of-band entropy query. The entropy may be used for OAM and other use cases. This allows for verifying/evaluating ECMP performance on a particular network entity in a network, avoiding the need to expose the hashing algorithm, and also without overloading the control plane in the network with numerous queries.

In one form, a method is provided comprising: in a network that includes a plurality of nodes, obtaining information indicating equal cost multi-path (ECMP) paths in the network and a branch node in the network; for the branch node in the network: instantiating a virtual network function that simulates an ECMP hashing algorithm employed by the branch node to select one of multiple egress interfaces of the branch node; providing to the virtual network function for the branch node, a query containing entropy information as input to the ECMP hashing algorithm that returns interface selection results; and obtaining from the virtual network function a reply that includes the interface selection results.

The method further includes evaluating ECMP performance in the network based on the interface selection results obtained for the branch node.

In another form, an apparatus is provided comprising: a communication interface configured to enable network communications; and a processor coupled to the communication interface, wherein the processor is configured to perform operations including: obtaining information indicating equal cost multi-path (ECMP) paths in a network and a branch node in the network; for the branch node in the network: instantiating a virtual network function that simulates an ECMP hashing algorithm employed by the branch node to select one of multiple egress interfaces of the branch node; providing to the virtual network function for the branch node, a query containing entropy information as input to the ECMP hashing algorithm that returns interface selection results; and obtaining from the virtual network function a reply that includes the interface selection results; and evaluating ECMP performance in the network based on the interface selection results obtained for the branch node.

Further still, one or more non-transitory computer readable storage media are provided, encoded with instructions that, when executed by a processor, cause the processor to perform operations including: obtaining information indicating equal cost multi-path (ECMP) paths in a network and a branch node in the network; for the branch node in the network: instantiating a virtual network function that simulates an ECMP hashing algorithm employed by the branch node to select one of multiple egress interfaces of the branch node; providing to the virtual network function for the branch node, a query containing entropy information as input to the ECMP hashing algorithm that returns interface selection results; and obtaining from the virtual network function a reply that includes the interface selection results; and evaluating ECMP performance in the network based on the interface selection results obtained for the branch node.

In still another form, a system is provided that includes an orchestrator entity and a physical host computing device, wherein the orchestrator entity is in communication with a plurality of nodes of a network. The orchestrator entity obtains information about equal cost multi-path (ECMP) paths in the network and a branch node in the network. The orchestrator entity then, for the branch node in the network, instantiates on the physical host computing device, a virtual network function that simulates an ECMP hashing algorithm employed by the branch node to select one of multiple egress interfaces of the branch node. The orchestrator providing to the virtual network function for the branch node, a query containing entropy information as input to the ECMP hashing algorithm that returns interface selection results. The orchestrator entity obtains from the virtual network function a reply that includes the interface selection results. The orchestrator entity then evaluating ECMP performance in the network based on the interface selection results obtained for the branch node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   in a network that includes a plurality of nodes, obtaining information indicating multiple paths in the network and a branch node in the network; and
   for the branch node in the network:
      simulating a hashing algorithm employed by the branch node that is used to select one of multiple egress interfaces of the branch node;
      providing as input to the hashing algorithm, entropy information; and
      obtaining from the hashing algorithm, interface selection results produced by the hashing algorithm based on the entropy information; and
   evaluating performance in the network based on the interface selection results.

2. The method of claim 1, wherein the providing includes providing a range of entropy that causes the hashing algorithm to generate interface selection results that include a range of entropy that results in selection of each egress interface of the multiple egress interfaces of the branch node.

3. The method of claim 1, wherein providing includes providing a specific entropy that causes the hashing algorithm to generate interface selection results indicating a particular egress interface of the multiple egress interfaces of the branch node that will be selected for the specific entropy.

4. The method of claim 1, wherein the hashing algorithm is executed by a virtual network function running on a physical host computing device.

5. The method of claim 4, wherein obtaining the information indicating the multiple paths in the network comprises an orchestrator entity querying a path computation element for the network.

6. The method of claim 1, further comprising repeating the simulating, providing as input and obtaining interface selection results for each of a plurality of hashing algorithms.

7. The method of claim 1, wherein the hashing algorithm is an Equal-Cost Multi-Path (ECMP) hashing algorithm, and the entropy information includes one or more of: a range of source/destination Internet Protocol (IP) addresses, a specific source IP address, a specific destination IP address, a range of source/destination User Datagram (UDP) ports, and source/destination labels.

8. The method of claim 1, further comprising performing a configuration change to one or more nodes in the network based on the evaluating.

9. An apparatus comprising:
   a communication interface configured to enable network communications; and
   a processor coupled to the communication interface, wherein the processor is configured to perform operations including:
   obtaining information indicating multiple paths in a network and a branch node in the network; and
   for the branch node in the network:
      simulating a hashing algorithm employed by the branch node that is used to select one of multiple egress interfaces of the branch node;
      providing as input to the hashing algorithm, entropy information; and
      obtaining from the hashing algorithm, interface selection results produced by the hashing algorithm based on the entropy information; and
   evaluating performance in the network based on the interface selection results.

10. The apparatus of claim 9, wherein the processor is configured to perform the providing by:
   providing a range of entropy that causes the hashing algorithm to generate interface selection results that include a range of entropy that results in selection of each egress interface of the multiple egress interfaces of the branch node.

11. The apparatus of claim 9, wherein the processor is configured to perform the providing by:
providing includes providing a specific entropy that causes the hashing algorithm to generate interface selection results indicating a particular egress interface of the multiple egress interfaces of the branch node that will be selected for the specific entropy.

12. The apparatus of claim 9, wherein the processor is configured to perform the obtaining information indicating the multiple paths by querying a path computation element for the network.

13. The apparatus of claim 9, wherein the processor is further configured to perform a configuration change to one or more nodes in the network based on the evaluating.

14. The apparatus of claim 9, wherein the hashing algorithm is an Equal-Cost Multi-Path (ECMP) hashing algorithm, and the entropy information includes one or more of: a range of source/destination Internet Protocol (IP) addresses, a specific source IP address, a specific destination IP address, a range of source/destination User Datagram (UDP) ports, and source/destination labels.

15. The apparatus of claim 9, wherein the processor is configured to repeat the simulating, providing as input and obtaining interface selection results for each of a plurality of hashing algorithms.

16. One or more non-transitory computer readable storage media encoded with instructions that, when executed by a processor, cause the processor to perform operations including:
obtaining information indicating multiple paths in a network and a branch node in the network; and
for the branch node in the network:
simulating a hashing algorithm employed by the branch node that is used to select one of multiple egress interfaces of the branch node;
providing as input to the hashing algorithm, entropy information; and
obtaining from the hashing algorithm, interface selection results produced by the hashing algorithm based on the entropy information; and
evaluating performance in the network based on the interface selection results.

17. The one or more non-transitory computer readable storage media of claim 16, wherein the providing includes providing a range of entropy that causes the hashing algorithm to generate interface selection results that include a range of entropy that results in selection of each egress interface of the multiple egress interfaces of the branch node.

18. The one or more non-transitory computer readable storage media of claim 16, wherein providing includes providing a specific entropy that causes the hashing algorithm to generate interface selection results indicating a particular egress interface of the multiple egress interfaces of the branch node that will be selected for the specific entropy.

19. The one or more non-transitory computer readable storage media of claim 16, wherein the instructions further cause the processor to repeat the simulating, providing as input and obtaining interface selection results for each of a plurality of hashing algorithms.

20. The one or more non-transitory computer readable storage media of claim 16, wherein the hashing algorithm is an Equal-Cost Multi-Path (ECMP) hashing algorithm, and the entropy information includes one or more of: a range of source/destination Internet Protocol (IP) addresses, a specific source IP address, a specific destination IP address, a range of source/destination User Datagram (UDP) ports, and source/destination labels.

\* \* \* \* \*